United States Patent
Rahman et al.

(10) Patent No.: US 8,284,934 B2
(45) Date of Patent: Oct. 9, 2012

(54) SYSTEMS AND METHODS FOR SHARED SECRET DATA GENERATION

(75) Inventors: Iftekhar Rahman, Billerica, MA (US); Christopher M. Schmidt, Branchburg, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 479 days.

(21) Appl. No.: 12/506,675

(22) Filed: Jul. 21, 2009

(65) Prior Publication Data

US 2011/0022834 A1    Jan. 27, 2011

(51) Int. Cl.
 *H04L 9/00* (2006.01)
(52) U.S. Cl. .......................................................... 380/44
(58) Field of Classification Search .............. 380/44, 380/46, 247, 259, 268, 271, 272, 273, 277, 380/286
See application file for complete search history.

(56) References Cited

U.S. PATENT DOCUMENTS

| | | | | |
|---|---|---|---|---|
| 7,327,216 B2* | 2/2008 | Ghabra et al. | | 340/5.26 |
| 7,945,053 B2* | 5/2011 | Qi et al. | | 380/283 |
| 8,094,821 B2* | 1/2012 | Hsu | | 380/270 |
| 2004/0083368 A1 | 4/2004 | Gehrmann | | |
| 2006/0205386 A1* | 9/2006 | Yu et al. | | 455/411 |
| 2007/0269048 A1 | 11/2007 | Hsu | | |
| 2008/0170691 A1* | 7/2008 | Chang et al. | | 380/270 |
| 2009/0197571 A1* | 8/2009 | Kitajima et al. | | 455/411 |
| 2010/0211687 A1* | 8/2010 | Jaber et al. | | 709/228 |

FOREIGN PATENT DOCUMENTS

EP    1841260 A2    10/2007

OTHER PUBLICATIONS

European Search Report from corresponding EP Application No. 10007589.4 dated Dec. 2, 2010.

* cited by examiner

*Primary Examiner* — Beemnet Dada

(57) ABSTRACT

Disclosed examples of secure communications involve generating, by a mobile communication network device, a shared secret data having a length of M units. A first operation on groups of one of N units of a randomly generated base shared secret data and one of a plurality of secret values thereby generates a plurality of first operation results. A second operation on a select plurality of the first operation results generates a plurality of second operation results. The randomly generated base shared secret data can have a length of N units, where N is less than M. The shared secret data is constructed from at least one of the first operation results and the plurality of second operation results.

29 Claims, 5 Drawing Sheets

SYSTEMS AND METHODS FOR SHARED SECRET DATA GENERATION

TECHNICAL FIELD

The present subject matter relates to secure communications. In particular, the subject matter relates to technologies for generating a shared secret data that can be used in providing secure communications.

BACKGROUND

Many authentication schemes and encryption schemes require the use of a Shared Secret Data (SSD) that is available only to the entities (typically two entities) that are engaged in exchanging information or are using the services provided by one of the entities. To prevent the SSD from being compromised, (e.g., through electronic eavesdropping or other means), the SSD may not always be provided to the two entities directly. Instead a string of information (e.g., a BaseSSD) may be provided to the two entities. The BaseSSD may then be modified (e.g., processed and manipulated) and extended to obtain the SSD.

Often, the generation of the SSD from the BaseSSD is done in an ad hoc fashion. The disadvantage of this method is that if the scheme is compromised then the implementation of a new scheme needs the involvement of the original individuals. Changing schemes is time consuming.

Location based services (LBS) provided by mobile communications network continue to gain user acceptance. One requirement of LBS services is determining the location of the mobile station or other network device (e.g., laptop, mobile client, PC Card, etc.) for use with the LBS service application. Privacy laws and end users require that the location of a mobile station be protected. Thus, mobile communication network operators must prevent access to this location data. One way to protect the location information is to encrypt the data. Another way to protect the data is to restrict access to the mobile communications network and specific devices operating on the network.

In addition, many public key/private key encryption schemes require large amounts of processing resources. These methods do not lend themselves to use in some applications. For example, some devices (e.g., certain mobile stations and other computing devices) lack the processing power to effectively use advanced encryption methods. Using the advanced encryption methods could, in some instances, prevent the processor from performing other functions.

Thus, a need exists for a way to generate a shared secret data that is flexible (e.g., relatively easy to change) and does not overwhelm the processing capabilities of certain devices.

SUMMARY

The teachings herein alleviate one or more of the above noted problems with the known methods for providing secure communications. In various instances, one or more elements of the mobile communications network (e.g., mobile stations, network servers and switches, computer accessing the mobile communications networks, etc.) is programmed to generate a shared secret data from a base shared secret data.

In one example, scrambling is performed in a well defined manner where certain algebraic operations are used. At the same time the algebraic operations are defined in a way which makes the result entirely dependent on a set of secret parameters (e.g., bit values) and mappings. Without a knowledge of these secrets the operations themselves would be of no use to the entity from whom this information is intended to be kept secret, (e.g., a hacker). Making the algebraic operations intrinsically unobvious helps in making the actual programming code appear to be obfuscated.

In one instance, the disclosure relates to a method of generating, by a mobile communication network device, a shared secret data having a length of M units. The method includes performing, a first operation on groups of one of N units of a randomly generated base shared secret data and one of a plurality of secret values thereby generating a plurality of first operation results. A second operation is performed on a select plurality of the first operation results, thereby generating a plurality of second operation results. The randomly generated base shared secret data can have a length of N units, where N is less than M. The method also includes constructing the shared secret data from at least one of the first operation results and the plurality of second operation results. The before-mentioned operations can be performed by a mobile communications network device. Examples of mobile communications network devices include, but are not limited to, mobile stations, network servers, network switches, computers accessing the mobile communication network via a network access card.

In some examples, performing a first operation includes performing modulo integer arithmetic on the groups of one of the N units of the base shared secret data and one of a plurality of secret values thereby generating a plurality of first operation results. Performing a second operation can include performing an exclusive OR (XOR) on the select plurality of the first operation results thereby generating a plurality of second operation results.

In some cases, the method includes mapping each of the N units of the base shared secret data and the plurality of secret values to corresponding secret integer values prior to performing the first operation. In addition, the method can include mapping a select plurality of the first operation results from corresponding secret values prior to performing the second operation. The method, in some examples, includes generating the randomly generated base shared secret data prior to performing the first operation.

In some examples, the method includes using the shared secret data during communications with another mobile communication network device. In one case, using the shared secret data includes applying the shared secret data to data to generate encrypted data and transmitting the encrypted data to the other mobile communication network device. In another instance, using the shared secret data includes decrypting received encrypted data using the shared secret data to generate unencrypted data at the mobile communication network device. In addition to using the shared secret data to communicate between devices, the shared secret data can be used to secure communications within a single device (e.g., the multiple processors of a mobile station or a network card and a processor of a laptop computer).

In another instance, the present disclosure is directed to a mobile communications network that includes a traffic network configured to support communications and one or more mobile communication network devices in communication with the traffic network. Each of the mobile communication network devices can be configured to perform a first operation on groups of one of N units of a randomly generated base shared secret data and one of a plurality of secret values thereby generating a plurality of first operation results. Each device also can perform a second operation on a select plurality of the first operation results thereby generating a plurality of second operation results. The shared secret data is constructed from at least one of the first operation results and the plurality of second operation results. The randomly generated base shared secret data has a length of N units, where N is less than M.

In another instance, the disclosure is directed to an article of manufacture. The article of manufacture includes a machine readable storage medium and executable program instructions embodied in the machine readable storage medium. Execution of the program by a programmable mobile device in communication with a mobile communication network causes the mobile device to perform functions that generate a shared secret data having a length of M units. The functions also include performing a first operation on groups of one of N units of a randomly generated base shared secret data and one of a plurality of secret values thereby generating a plurality of first operation results, and performing a second operation on a select plurality of the first operation results thereby generating a plurality of second operation results. Again, the shared secret data is constructed from at least one of the first operation results and the plurality of second operation results. The randomly generated base shared secret data has a length of N units, where N is less than M;

In some cases, the function of performing a first operation includes performing modulo integer arithmetic on the groups of one of the N units of the base shared secret data and one of a plurality of secret values thereby generating a plurality of first operation results. The function of performing a second operation includes performing an exclusive OR (XOR) on the select plurality of the first operation results thereby generating a plurality of second operation results.

In other cases, the functions also include mapping each of the N units of the base shared secret data and the plurality of secret values to corresponding secret integer values prior to performing the first operation. This can include mapping a select plurality of the first operation results from corresponding secret values prior to performing the second operation. In other cases, the functions further comprise generating the randomly generated base shared secret data prior to performing the first operation.

In some instances, the functions include using the shared secret data during communications with another mobile communication network device. Using the shared secret data can include applying the shared secret data to data prior to generate encrypted data and transmitting the encrypted data to the another mobile communication network device. Using can also include decrypting received encrypted data using the shared secret data to generate unencrypted data at the mobile communication network device. The shared secret data can also be used to communicate between a plurality of processors of the mobile device.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to generating a shared secret data. A base shared secret data is processed, manipulated, and in some cases extended to create the shared secret data. The extension of the base shared secret data can be accomplished using a scrambling algorithm that modifies and extends the base shared secret data. The scrambling is performed in a well defined manner where certain algebraic operations are used. At the same time the algebraic operations are defined in a way which makes the result entirely dependent on a set of secret values and mappings. Without a knowledge of these secrets the operations themselves would be of no use to the entity from whom this information is intended to be kept secret, (e.g., a hacker). Making the algebraic operations intrinsically unobvious helps in making the actual programming code appear to be obfuscated.

Figure 1:
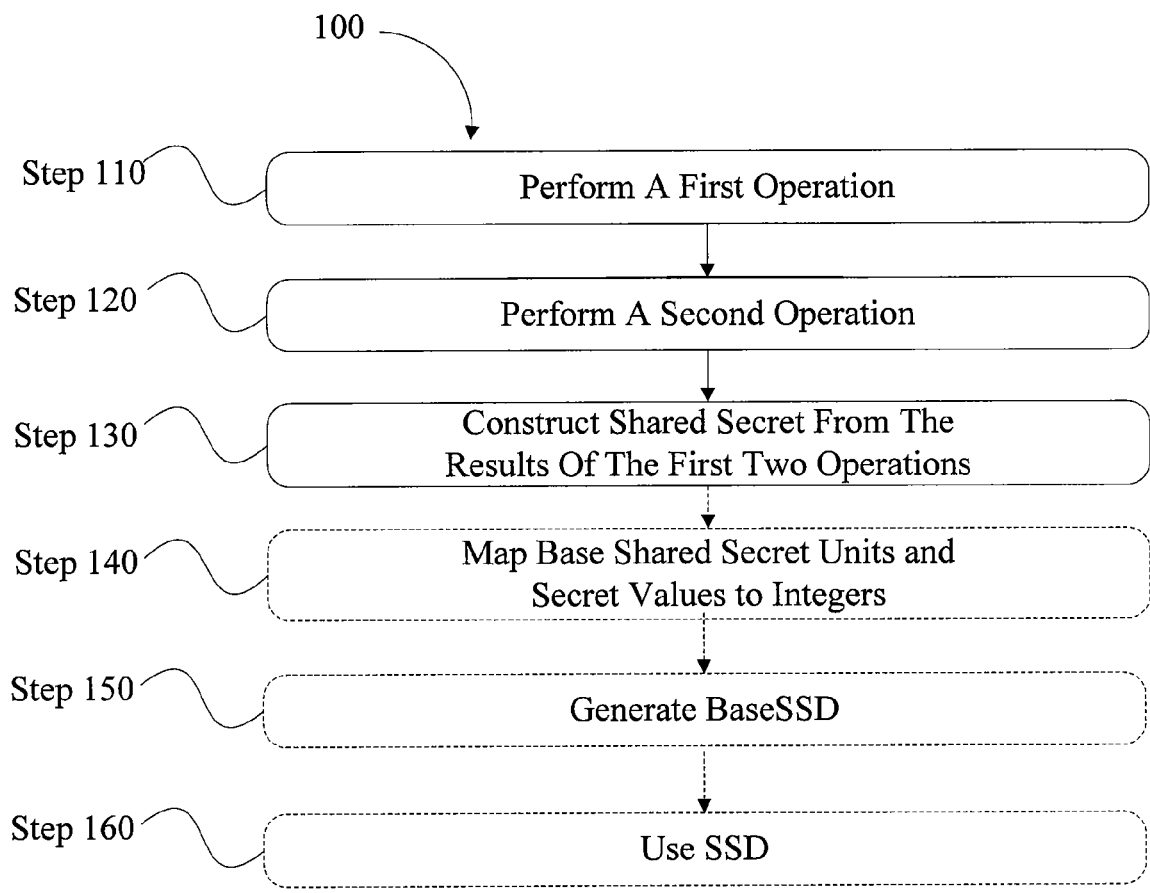
FIG. 1 is a flow chart depicting a method of generating a shared secret data.

Before describing how the shared secret data can be used in many different situations (e.g., for authentication of mobile devices, authentications of users, secure communications between components of a network such a client and server, secure communication among processors of a computing device, etc.), it may be helpful to explain the details and provide examples of how the shared secret data is generated from a base shared secret data using specified algebraic operations and shared secret data values. With reference to FIG. 1 a method 100 of generating a shared secret data value is shown and described. Prior to describing the method 100 is it helpful to set out a number of parameters that used in the method 100.

Typically, base shared secret data (baseSSD) consists of units of "N" bytes that are randomly generated by a baseSSD generator. Although the units of the baseSSD are described in terms of bytes, it should be understood that other measures (e.g., hex values, multiple hex values, multiple bytes, etc.) can be used. It is suggested that the unit of measure be based on an integer power of 2, although this is not necessary.

It is the above-reference baseSSD that is processed, manipulated, and in some cases extended to create the shared secret (also referred to as shared secret data (SSD)) that is used to secure communications. Typically the resulting shared secret data has "M" units (e.g., M bytes), where M is greater than N. Again, the M units are not limited to bytes and can be any other unit of measure which is based on an integer power of 2. The number of units in the SSD can be based on a polynomial expansion of terms (e.g., $(ax+b)(cx^2+dx+e)$) or some other algebraic operation.

In order to create the SSD, a number of secret parameters "P" are used. These shared secret parameters P can also be byte values or any of the before-mentioned units of measure. The number of secret parameters P is dependent on both M and N.

Also, depending on the algebraic operations that are used, it may be necessary to include a secret mapping that can be used to convert the M, N, and P units to another different forms. For example, the secret mapping can be used to covert the byte values to integer values to facilitate modulo integer arithmetic.

In addition, a number of algebraic operations (e.g., algebraic functions) are defined. These operations operate on the above-describe values and mappings to extend the baseSSD to create the SSD. Examples of the algebraic operations are too numerous to list, thus the following are a select few operations from the universe of operations: modulo integer arithmetic, exclusive OR (XOR) operations, addition, subtraction, division, multiplication, etc.

Having described some of the parameters used in the method 100 to create the SSD, additional features of the method 100 are described. The method 100 includes performing (step 110) a first operation on groups of one of N units of a randomly generated base shared secret data (baseSSD) and one of a plurality of secret values thereby generating a plurality of first operation results. The method 100 also includes performing (step 120) a second operation on a select plurality of the first operation results thereby generating a plurality of second operation results, and constructing (step 130) the shared secret data from at least one of the first operation results and the plurality of second operation results. These operations can be performed in one or more network devices (e.g., mobile stations, network cards, network elements, etc.) or in other devices such as clients and servers.

In performing (step 110) a first operation, a unit (e.g., a byte) of the randomly generated base shared secret data and one of the secret values, which can also be a byte, are used as parameters in a first operation. In one instance, the first operation can be modulo integer arithmetic. The operation generates first operation results. One or more of the first operation results can be used as a term of the shared secret data (SSD).

It might be helpful to assume some parameters of the randomly generated base shared secret data and the plurality of shared secret parameters. In one example, it is assumed that baseSSD is four bytes in length and represented by A3, A2, A1, and A0. Also, it is assumed that there are two secret parameters P1 and P0, each being a byte in length. With this in mind, performing (step 110) the first operation can be performing modulo integer arithmetic on the group A3 and P1. In addition, the first operation can be performed on each combination of the baseSSD and the two secret parameters (i.e. groups (A3, P1), (A2, P1), (A1, P1), (A0, P1), (A3, P0), (A2, P0), (A1, P0), and (A0, P0). Of course, not all combinations need to be performed. Instead only a subset of the plurality of the combinations may be performed. Also, although shown and described as pairs it should be understood that depending on the nature of the first operation a greater number of elements can be operated on (e.g., groups of triplets can be operated on) to generate the first operation results.

In some instances, the method can include mapping (step 140) all or some of the baseSSD parameters and/or the secret parameters to different representations. For examples, the byte values can be mapped to secret integer values. This mapping (step 140) can facilitate completion of the first operation. Continuing with the above example, each of the byte values A3, A2, A1, A0, P1, P0 can be mapped (step 140) a representative integer value according a secret mapping. In some cases, if the bits in the byte are all zero then no mapping is required.

In order to facilitate the mapping of bytes to integers, it is assumed that each byte is constructed of a number of bits (e.g., four bits per byte). Each byte can have a most significant bit and a least significant bit. The table used to map the bytes to integers should be dependent on the number of bits per byte. For example, if four bits per byte are used then the mapping table should have fifteen entries. One entry for each bit combination excluding the all zero bit case.

This secret mapping can also be used to transform integer values (e.g., a result of a first operation) to byte values. For example, the results of the first operation may yield integer values. These results can be mapped back to byte values prior to the execution of the second operation on the select results. Further details of these mappings between various states (e.g., bytes and integers) are provided below in more detail.

In addition to performing a first operation, the method 100 also includes performing (step 120) a second operation on a select plurality of the first operation results thereby generating a plurality of second operation results. For example, an "exclusive or" (XOR) is performed on various combinations of some or all of first operation results. Conceptually, it can be thought of as the second operation is performed on a nested combination of first operations. Continuing with the above example, an XOR operation can be performed on groups of first operation results to generate a plurality of second operation results. These second operation results can be used as one or more terms of the shared secret data (SSD). In more detail, an XOR operation can be performed on the group of the results of the modulo integer arithmetic performed on two or more of the groups (A3, P1), (A2, P1), (A1, P1), (A0, P1), (A3, P0), (A2, P0), (A1, P0), and (A0, P0). Again, further details of the second operation are provided below in more detail.

The method 100 also includes constructing (step 130) the shared secret from at least one of the first operation results and the plurality of second operation results. Said another one, one or more of the first operation results is used in constructing the SSD. In addition, one or more of the second results is also used in constructing the SSD. The SSD can be an ordered string of the first operation results and the second operation results. The SSD consists of a predetermined M number of units (e.g., bytes). In some cases, the number of units M of the SSD is greater than the number of units N in the baseSSD.

The method 100 can also include generating (step 150) the randomly generated base shared secret data (baseSSD) prior to performing the first operation. For example a random number generator can be used. The baseSSD can be generated by the same device executing the method 100 or by a different device. The baseSSD is a string of randomly generated bits. After the baseSSD is generated as a sting of bits, it is processed further to generate a sting of N units.

The method 100 can also include using (step 160) the shared secret data during communications with another mobile communication network device. One use for the shared secret data is to scramble and secure location based information within a mobile communication network. This data can be secured for communication among processors in the same device or for communication between devices on the mobile communication network.

Another use can be for providing challenge responses. That is, the scrambling methods described herein can be used to generate access credentials or scramble access credentials. For example, the systems and method described herein can be used to restrict access to the mobile communications network, other communications networks, or services within any of these networks. One example includes restricting access to Music-On-Demand (MOD) or video-on-demand (VOD) services provided by the mobile communications network operator. From these examples, it should be apparent that there are a number of other uses for the techniques and apparatuses described herein.

In order to further illustrate some of the above-described concepts, the following example is provided. Again, this example should not be viewed as limiting the disclosure in any way or the appended claims. Before details of the scrambling operations are described specific parameters are provided. In the following example, it is assumed that the desired shared secret data (SSD) has five 3-bit nibbles (i.e., M=5: where each 3-bit nibble is represented respectively as B4, B3, B2, B1, and B0). The base shared secret data (baseSSD) has four 3-bit nibbles (i.e., N=4; where each 3-bit nibble is represented respectively as A3, A2, A1, A0). In addition, two secret parameters are known. Each of the secret parameters P1 and P0 is also a 3-bit nibble. Also, a secret mapping table that translates the 3-bit nibbles into integer values is provided. Because this illustrations uses a baseSSD and secret parameters that are 3-bit nibbles, the secret mapping table has seven entries (i.e., $2^3-1$) (no entry is provided for the case where the 3-bit nibble is all zeros). Further, the first operation is designated as modulo integer arithmetic. A mathematical representation for the first operation is: Operation1 [A,P]=(j+k) Modulo(7), where j and k are positive integers that correspond to the integers values in the secret mapping table for each 3-bit nibble. The second operation is a bitwise "exclusive or" (XOR) operation. In order to perform Operation1 in this example, a secret mapping table that translates the 3-bit nibbles into integer values is provided in Table 1.

TABLE 1

| MSB | | LSB | Integer |
|---|---|---|---|
| 0 | 1 | 0 | 1 |
| 1 | 0 | 0 | 2 |
| 0 | 1 | 1 | 3 |
| 1 | 1 | 0 | 4 |
| 1 | 1 | 1 | 5 |
| 1 | 0 | 1 | 6 |
| 0 | 0 | 1 | 7 |

Assume that the following values are assigned for the above-mentioned 3-bit nibbles of the baseSSD: A3=110; A2=000; A1=101; and A0=010. Assume that the following values are assigned for the above-mentioned 3-bit nibbles of the secret values: P1=110; and P0=001. In this example, the resulting unit values for the generated shared secret data are defined as:
B4=Operation1(A3,P1);
B3=Operation2{Operation1(A3,P0), Operation1(A2,P1)};
B2=Operation2{Operation1(A2,P0), Operation1(A1,P1)};
B1=Operation2 {Operation1 (A1,P0), Operation1 (A0,P1)}; and
B0=Operation2 {Operation1 (A0,P0)}.

Replacing the groups with the nibble values yields:
B4=Operation1(110, 110);
B3=Operation2{Operation1(110, 001), Operation1(000, 110)};
B2=Operation2{Operation1(000, 001), Operation1(101, 110)};
B1=Operation2{Operation1(101, 001), Operation1(010, 110)}; and
B0=Operation2{Operation1(010, 001)}.

Using the secret mapping table from above, the 3-bit nibbles are replaced with the corresponding integer values to yield:
B4=Operation1(4, 4);
B3=Operation2{Operation1(4, 7), Operation1(000, 4)};
B2=Operation2{Operation1(000, 7), Operation1(6, 4)};
B1=Operation2{Operation1(6, 7), Operation1(1, 4)}; and
B0=Operation2{Operation1(1, 7)}.

After performing operation1, which in this example consists of summing the integer values and performing Modulo7 arithmetic, yields the following first results in integer form:
B4=1;
B3=Operation2{4, 000};
B2=Operation2{000, 3};
B1=Operation2{6, 5}; and
B0=Operation2{1}.

Prior to performing the second operation, in this example a bit-wise XOR operation, the integer values are converted back to the corresponding 3-bit nibbles found in the secret mapping table. This yields:
B4=010;
B3=Operation2{110, 000};
B2=Operation2{000, 011};
B1=Operation2{101, 111}; and
B0=Operation2{010}.

To produce the final 3-bit nibble units of SSD, the second operation is performed and yields the following results:
B4=010;
B3=110
B2=011;
B1=010; and
B0=010.

To construct the SSD the units are combined in their designated order. This yields a shared secret data of: 010110011010010. Having constructed the SSD, it is subsequently used in any of a number of scenarios. For example, the SSD can be used to scramble or encrypt the data identifying the GPS location of a mobile handset and provide that encrypted location information to a location based application, which decrypts or unscrambles the information using the same SSD. In order to properly decrypt or unscramble the information, the device executing the location based application also has a copy of the secret mapping table, the shared secret nibbles, and knows the number of units in the baseSSD. From this information, the receiving device can generate the same SSD and use that to successfully unscramble or decrypt the encoded information.

In addition to encrypting information, the above-described method can be used to generate an access key (e.g., a password) used in order to gain access to resources. Said another way, the above-described method can be used for device authentication. For example, a first device can issue a challenge to the device trying to access the resource. As part of the challenge, a baseSSD is provided to the device trying to access the resource. In response, that device generates the SSD according to the method 100 and provides the SSD as the response to the first device. The received SSD is confirmed as an expected response by the first device and access to the resource is granted.

Figure 2:
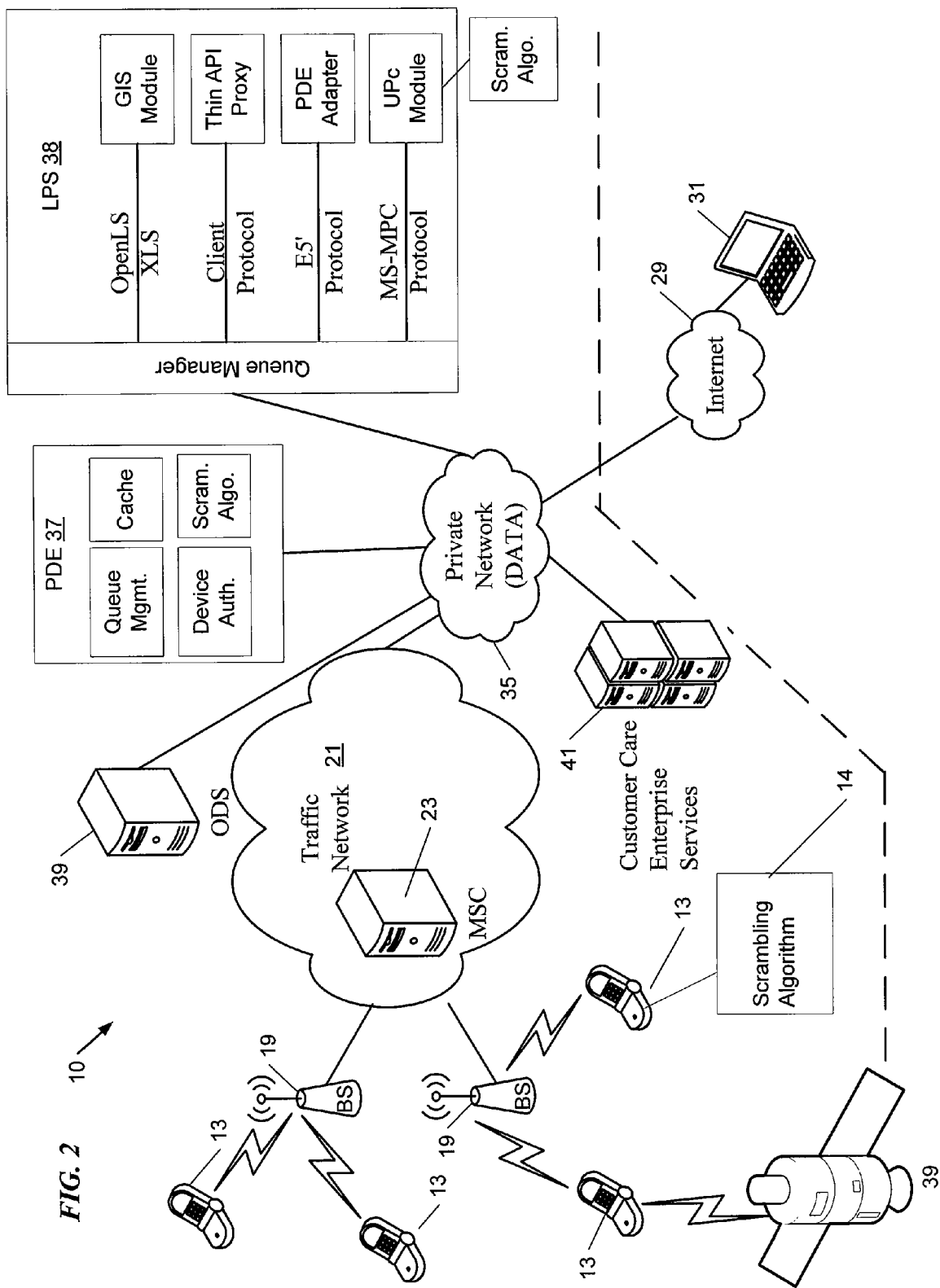
FIG. 2 is a functional block diagram that depicts various components of an exemplary mobile communications network.

With respect to FIG. 2, further examples of the above-mentioned uses are explained. FIG. 2, illustrates a mobile communication network 10 as may be operated by a carrier or service provider to provide a wide range of mobile communication services (e.g., location based services (LBS) and E-911 services) and ancillary services or features to its subscriber customers and associated mobile station (MS) users. The elements generally indicated by the reference numeral 10 generally are elements of the network and are operated by or on behalf of the carrier, although the mobile stations typically are sold to the carrier's customers. The mobile communication network 10 provides communications between mobile stations as well as communications for the mobile stations with networks and stations outside the mobile communication network 10

Techniques, software and equipment are disclosed that can implement the above-described methods. For example, the techniques can be used to provide authentication services, provide secure data communications, and others. In one examples, the techniques can be used to protect location information related to a mobile station. The location information can be used be used by other application (e.g., mobile instant messaging (MIM)) and other location based services (LBS) provided by the network carrier. The location information of the mobile station is obtained by the cooperation of elements of a location based service platform (LBSP) of the mobile wireless communication network, such as a location proxy server (LPS) and a position determining entity (PDE).

Reference now is made in detail to the examples illustrated in the accompanying drawings and discussed below. FIG. 2 provides a high-level functional illustration of an overall communication network 10 offering mobile communication services, including location based service (LBS). The communication network 10 can be a mobile wireless communications network operated by one or more service providers or "carriers." Although the present concepts are applicable to other network architectures, for this discussion, it is assumed that the wireless communication network 10 is a public cellular telephone network of the type represented in high level functional block diagram form in FIG. 2.

The wireless mobile communication network 10 provides mobile communication services to a number of mobile stations (MS) of various types, one of which is represented by way of example as a handset type mobile station 13 in the drawing. A public cellular telephone type network typically offers an array of voice telephone services and packet data communication services to users of the mobile stations 13.

The wireless mobile communication network 10 might be implemented as a network conforming to the code division multiple access (CDMA) CDMA2000 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards such as Universal Mobile Telecommunications System (UMTS) and Long Term Evolution (LTE) used for public mobile wireless communications that offer the packet data transport for use by one or more applications. The mobile stations 13 may be capable of conventional voice telephone communications. However, for some applications, the mobile stations 13 have IP packet data communication capabilities, and the wireless communication network 10 provides wireless IP packet communications to and from each of the mobile stations 13. A variety of different types of mobile stations supporting such communications are widely available (e.g., handsets, personal digital assistants (PDAs), laptop or other computers with cellular network cards, and the like). Those skilled in the art should be familiar with the general structure and operation, both of the mobile stations and the wireless networks, therefore a relatively high-level description thereof is provided here.

The mobile station 13 will be programmed to implement a variety of functions, in a manner discussed later. Of note for purposes of this discussion, the mobile station 13 will run one or more programs that execute the methods and techniques described above, the program(s) are referred to as scrambling algorithm 14. Again the scrambling algorithm 14 can be used in authentication scenarios. Further, the scrambling algorithm 14 can be used to provide secure communications between the MS 13 and the other elements of the communications network 10. Also, as described in more detail below, the algorithm can be used to provide secure communications among processors and processors of the mobile station 13.

The wireless mobile communication network 10 typically includes a number of radio access networks, serving various regions. Physical elements of a radio access network (RAN) include a number of base stations (BS) 19, which can include a base transceiver system (BTS) and the associated antennae system. The BS 19 communicates via the antenna(s) at the site of base station and thus over the air-link with one or more of the mobile stations 13, when the mobile stations are within range. In this way, the base station provides wireless communication service over a coverage area often referred to as a "cell."

The RAN also includes a traffic network 21, which carries the user communications for the mobile stations 13. In a 1xRTT or similar implementation, for example, the RAN includes a number of radio access network switches, typically modern versions of mobile switching centers, represented in the drawing by the MSC 23. The MSC 23 supports both cellular voice communications, e.g. to other mobile stations and/or through the public switched telephone network (PSTN), as well as packet data services for various applications (e.g., location based services). Each such MSC switch 23 connects through trunk circuits (not shown) to a number of the base stations 19, which the respective MSC 23 serves and controls.

The wireless communication network 10 also includes a private data network 35 that can, for example, provide access to the Internet 29, for e-mail, web browsing and a variety of other applications such as accessing a personal computer (PC) 11. In addition, the private data network 35 provides a means for packet-based communications among network elements such as a position determining entity (PDE) 37, a location proxy server (LPS) 38, and a customer care enterprise service server (CCES) 41. The private data network can also provide access to one or more on-demand severs (ODS) 39 such as Music On-Demand and a Video On-Demand services. The private data network can support many types of packet-based communications using many known protocols such as the transmission control protocol over internet protocol (TCP/IP) and the user datagram protocol over internet protocol (UDP/IP).

The network 10 is also configured to perform position or location determinations with respect to mobile stations 13 and to provide location based services based on determinations of positions of the mobile stations 13. In order to protect a user's location from hackers and the like, the above-described methods can be used to scramble this location information. The scrambling algorithm allows the location information to be communicated among the network elements and across the internet 29 to a PC 31 (if desired).

For determining mobile station locations, the network 10 includes one or more Position Determining Entities (PDEs) 37. The PDE 37 is a network element that manages the position or geographic location determination of each mobile station 13. The exemplary network 10 utilizes an assisted GPS approach to the determination of mobile station location, in which the mobile station 13 takes measurements of signals from a number of GPS satellites 39 and interacts with the PDE 37 to process those measurements so as to determine the latitude and longitude (and possibly altitude) of the current location of the mobile station 13.

The PDE system 37 is essentially a general purpose programmable device with an interface for data communication via the network 35 running server software and running programming for implementation of the PDE functions, such a device authentication, data cache and processing queue management. The PDE 37 stores (e.g. in cache memory) or has access to a complete and up to date set of the satellite data for the constellation of GPS satellites 39 needed to allow computation of position based on pseudorange measurements from satellite signals. The data may include that associated with the entire constellation but will at least include the data for the satellites expected to be broadcasting into the geographic region serviced by the network 10.

When a mobile station 13 attempts a GPS position fix, the mobile station 13 provides information allowing the PDE 37 to perform a pre-fix. Typically, the mobile station 13 will provide data identifying the base station through which it is receiving service (and possibly the serving sector). In some implementations, the PDE 37 may receive data regarding several base stations/sectors and signal strengths thereof, for trilateration. The PDE 37 uses information about base station location(s) to process the data received from the mobile station so as to determine a region (e.g. area of the cell or sector, or a general area triangulated based on signals from several base stations) that the mobile station 13 is likely located within. The PDE 37 then uses the pre-fix location to parse the satellite data down, to assistance data that the mobile station 13 at the particular location needs in order to take GPS readings. The PDE 37 sends the parsed satellite data to the mobile station 13, for use in taking measurements of signals from appropriate satellites 39. The GPS assistance data may contain selected satellite almanac, satellite ephemeris, satellite visibility, Doppler and clock correction information.

The mobile station 13 will, in turn, use this information (also known as acquisition assistance records) to take multiple satellite pseudorange measurements. Depending on the device/network configuration, the mobile station 13 or the PDE 37 can then calculate a final fix using these pseudorange measurements. The final fix computation provides latitude and longitude (and possibly altitude) coordinates for the current location of the mobile station 13. If the mobile station 13 has full GPS computation capability, the station 13 would know its current latitude and longitude and would communicate that data to the PDE 37 through the network 10. Prior to the communication across the network 10, the mobile station 13 can scramble this location information using the above-described method 100.

In many cases, however, the mobile station 13 has only measurement capability, and the station forwards the measurement data to the PDE 37 to determine the final fix. Again, this measurements can be scrambled using the above-described methods. In either case, the GPS processing leads to a situation in which the PDE 37 knows the latitude and longitude of the mobile station 13. If necessary, the PDE 37 can provide coordinates to the mobile station 13.

For many applications further processing or access is needed. To provide access to general users, e.g. mobile subscribers and authorized third party users, the carrier also operates a location proxy server (LPS) 38. The LPS 38 is essentially a general purpose programmable device with an interface for data communication via the network 35 running server software and running programming for implementation of the LPS functionality. In the example, the server platform runs a queue manager for managing communications and access to the various LPS 38 program modules. The LPS 38 program modules include a thin API proxy client, for client-server proxy communications with the mobile stations 13. The LPS program modules also include a PDE adapter, for E5' protocol type communications through the network 35 with the PDE 37, e.g. for situations in which the LPS 38 needs to obtain mobile station position data from the PDE 37. In such a situation, both the PDE 37 and LPS 38 can execute the above-described methods to scramble, encrypt, and obscure, communications between these devices. That is, both the PDE 37 and the LPS 38 execute the above-described method or variations thereof. Said another way, the PDE 37 and LPS 38 use the scrambling algorithm 14 as part of their communications protocols.

In some configurations, the LPS program modules also include a user privacy component (UPc) and a Geographic Information System (GIS) component module. The UPc module uses the MS-MPC protocol to communicate through the network with the mobile stations 13. The UPc module manages and enforces subscriber permissions with regard to access to a user's location data, and this module authenticates all applications before allowing location fixes with regard to a mobile station location. The UPc can issue challenges and receive response to authenticate applications and user request for information. In some examples, the above-described methods are used to authenticate users requests and application requests for location information. In one case, the challenge/response scenario is used to generate SSD that is used to scramble communications between the LPS 38 and the requesting entity. Additional details are provided below with respect to FIG. 3.

The GIS component module provides various location specific information, such as mapping data (maps, roads, points of interest, etc.) and associated coding functions. For some applications, the GIS component provides a translation from the geographic coordinates of the mobile station location into an address, typically a street address, for that location. The GIS component module uses a variant of XML protocol adapted for location services, that is to say the open location service (OpenLS) XLS protocol.

In general, a party or system that needs or desires location information with regard to a mobile station 13 contacts the LPS 38. The LPS 38 authenticates that party and application and provides location related information. For example, a parent may want to know the location of their child's mobile station. As another example, a user of a mobile station may want information about their present location, e.g. to see a map or receive data about businesses or points of interest in the vicinity. Assuming the LPS 38 has this location information, the LPS 38 authenticates the requesting party using the techniques described herein. Once authenticated, the LPS 38 can scramble the location information using the above-described techniques to protect the requested location information from network eavesdroppers and the like. Further details of the authentication process are described with reference to FIG. 3.

Figure 3:
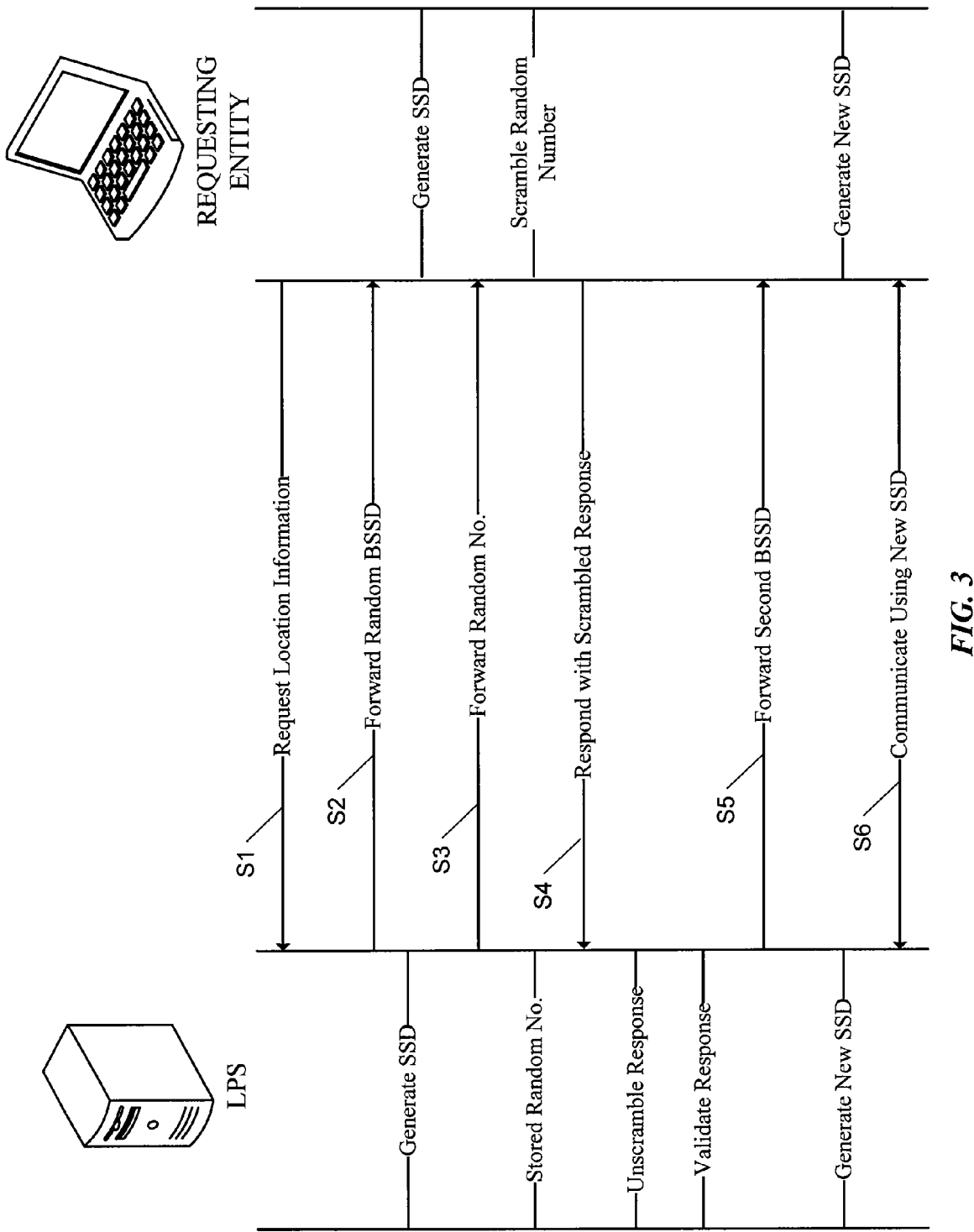
FIG. 3 is a flow chart depicting an authentication scenario using the scrambling techniques described herein.

FIG. 3 depicts a simplified flow chart depicting a method of authenticating a requesting entity (e.g., a mobile station 13, PC 11, or other network element) using the above-described techniques and algorithms. Initially, a requesting entity issues (step S1) a request for location information. The request may actually be a request for a baseSSD instead of the location information when the requesting entity already knows that it will have to authenticate itself to the LPS 38. The case of a request for location information, the request may originate from an application executing on the requesting entity.

In response, the LPS 38 forwards (step S2), a randomly generated baseSSD to the requesting entity. The randomly generated baseSSD can be generated by the LPS 38 itself using a know random number generator (not shown). Of course, the randomly generated baseSSD can be retrieve from another network entity. After forwarding the baseSSD, the LPS uses the transmitted baseSSD to generate a shared secret data key using the scrambling algorithm 14.

After receiving the randomly generated baseSSD, the requesting entity also generates a shared secret data key using the scrambling algorithm 14. The requesting entity stores the generated SSD key for future use.

Next, the LPS 38 forwards (step S3) a randomly generated number to the requesting entity. In the case of a randomly generated number, the same or a different random number generator can be used. The LPS 38 stores the forwarded randomly generated number for future comparison. In another example instead of transmitting a random number, the LPS 38 requests a known piece of data (e.g., a Mobile Identification Number (MIN) or electronic serial number (ESN)) from the requesting device.

After receiving the randomly generated number from the LPS 38, the requesting entity scrambles the received random number using the previously generated SSD key. In another example instead of scrambling a received random number, the requesting entity can scramble the information request from the LPS 38 (e.g., the MIN or ESN).

After scrambling the random number or requested information, the requesting entity responds (step S4) to the LPS 38 with the scrambled information. The LPS 38 descrambles the response from the requesting entity. The LPS 38 then validates the unscrambled data. For example, the LPS 38 can compare the stored random number with the descrambled random number. Also, the LPS 38 can compare the descrambled MIN or ESN with a list of know MINs and ESNs (this may require communication with other network elements such as home location register (HLR) which is not shown). Assuming the unscrambled data is what the LPS 38 expected, the requesting entity is authenticated. Thus communications is established and the location information is transmitted to the requesting entity. It should be apparent that the above-described technique can be used to authenticate a mobile station 13 to the mobile communication network 10 during network registration.

However in order to further secure the communications and protect the location information additional steps can be taken. For example and with continued reference to FIG. 3, after validating the requesting entity the LPS 38 can forward (step S5) another baseSSD to the requesting entity. Again, this baseSSD can be randomly generated number or some other piece of information that scrambling algorithm 14 can operate on.

Each of the requesting entity and the LPS 38 generate a second shared secret data (SSD) key. Again, the scrambling algorithm 14 is used. However, it should be understood that a secret scrambling algorithm 14' can be used that has different secret mapping table and secret data. The second SSD key is then used to scramble communications (step S6) between the requesting entity and the LPS 38.

One advantage of the above-described techniques is the relatively low processing requirements needed to the algorithm. Another advantage of this method is that in case the scrambling algorithm is compromised, then it can be changed very easily by changing the secret parameters and the secret mapping table. These changes can be communicated to the mobile stations 13 using over-the-air provisioning techniques and the like. Communicating these changes to the network elements can be done using traditional techniques as well.

In addition to securing communications between two separate elements as described above, the techniques and scrambling algorithm can be used for securing communications between processors and process executing on the same device. For example, many mobile stations 13 include two processors. One of the processors includes modem functionality for communicating with communications network 10 and the other processor executes users applications that might request location based information during execution (e.g., mobile instant messaging, navigation applications, and the like). Securing communications between the processors of the mobile station 13 can be achieved using the above described techniques.

Figure 4:
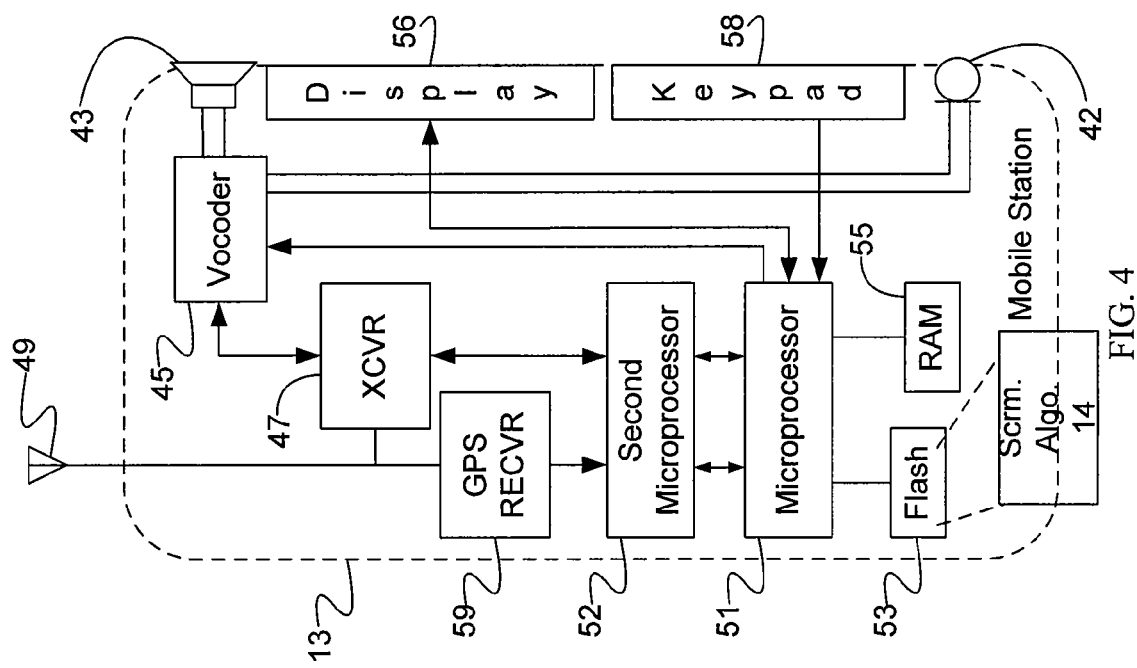
FIG. 4 is a simplified functional block diagram of a mobile station.

With reference to FIG. 4 a block diagram illustrating a GPS enabled mobile station 13 is shown and described. Although the station 13 may be incorporated into a vehicle mounted mobile unit or into another device, such as a portable personal computer or PDA, for discussion purposes the illustration shows the station 13 in the form of a handset. The handset embodiment of the mobile station 13 functions as a digital wireless telephone station. For that function, the station 13 includes a microphone 42 for audio signal input and a speaker 43 for audio signal output. The microphone 42 and speaker 43 connect to voice coding and decoding circuitry (vocoder) 45. For a voice telephone call, for example, the vocoder 45 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile station 13 also includes a digital transceiver (XCVR) 47. The concepts discussed here encompass embodiments of the station 13 utilizing any digital transceivers that conform to current or future developed digital wireless communication standards. For example, the transceiver 47 could be a TDMA or GSM unit designed for cellular or PCS operation. In the present embodiments, the digital transceiver 47 is a CDMA transceiver compatible with operation via an IS-95 network or a 1x network, to provide both voice and packet data communications. Also, the mobile station 13 may utilize either or both of 3GPP2 (1XRTT and EVDO) technologies and 3GPP (LTE/GSM/UMTS) technologies. In other Multimode transceivers also may be used.

The transceiver 47 provides two-way wireless communication of information, such as vocoded speech samples and/or digital message information. The transceiver 47 also sends and receives a variety of signaling messages in support of the various services provided via the station 13 and the network 10. Communications via the transceiver 47 and the antenna 49 may include various messages related acquisition assistance, position determination and related location based services. The transceiver 47 connects through RF send and receive amplifiers (not separately shown) to an antenna 49. In the example, the transceiver 47 is configured for RF communication in accord with a digital wireless protocol. The station 13 may include one or more additional transceivers, for example, for operation in an analog mode or in accord with an alternative digital standard.

A first microprocessor 51 and a second microprocessor 52 together serve as the programmable controller in that it controls all operations of the mobile station 13 in accord with programming that it executes. The mobile station 13 also includes flash type program memory 53 and/or a non-volatile random access memory (RAM) 55, for storing various software routines and mobile configuration settings, such as mobile identification number (MIN), etc. In a present implementation, the flash type program memory 55 stores an operating system, device driver software, call processing software and vocoder control software; and the memory may store any of a wide variety of other applications, such as client browser software and short message service software.

Of note for purposes of this discussion, the stored program software will also include the scrambling algorithm 14. The scrambling algorithm 14 provides functionality secure communications between the mobile station 13 and the network 10. In addition, the scrambling algorithm 14 can be used to secure communications between the first microprocessor 51 and the second microprocessor 52. The scrambling algorithm 14 can be use to scramble and descramble location information associated with the handset 13 as well as other information that requires secure communications.

In one instance, the scrambling algorithm 14 is downloaded from one of the elements to the mobile station 13 and stored therein. Another approach includes downloading the programming over the air, from a third party server (not shown), from a OTAF provisioning system (not shown) or the like, The scrambling algorithm 14 can also be loaded on the mobile station 13 by connecting the mobile station 13 to a personal computer (PC) and transferring the scrambling algorithm 14 to the PC to the mobile station 13 using known techniques. In addition, the scrambling algorithm 14 can be pre-programmed into the mobile station 13 by the original equipment manufacture.

The memories 53, 55 also store various data, such as telephone numbers and server addresses and data input by the user. For example, the memory 53 and/or the memory 55 will at various times store coordinates obtained from the GPS processing. In addition, the memories 53, 55 will store the secret mapping table and secret parameters.

As shown, the digital telephone handset 13 includes a display 56 for displaying messages, menus or the like, call related information dialed by the user, calling party numbers, and output from applications executing thereon. A keypad 58 enables dialing digits for voice and/or data calls and generating selection inputs keyed by the user based on any displayed menu. The display 56 and keypad 58 are the physical elements providing a textual or graphical user interface. In addition to normal telephone related input/output, these elements are also used for display of menus and other information to the user and user input of selections. Of course other user interface elements may be used, such as a stylus and touch sensitive display screen, as in a PDA or mobile smartphone.

For position determination and associated location based services, the mobile station 13 also includes a GPS receiver 59. Under control of one of the microprocessors 51, 52, the GPS receiver 59 receives and processes signals from one or more satellites of the constellation 19 of GPS satellites. From its processing, the GPS receiver 59 supplies GPS data to one or more of the microprocessors 51, 52, such as pseudorange measurements and associated PN codes for measured satellite signals. Associated computations may be performed in the microprocessor or by a processor or the like included in the GPS receiver. The GPS data can be scrambled according to the above described techniques and communicated among the microprocessors 51, 52 and the other network elements of the communications network 10.

If the receiver 59 or the combination of the receiver and the microprocessors 51, 52 are configured to provide a fully functional GPS position determination device, the station 13 could process the pseudorange measurements, absolute times of transmission of the GPS signals, and the satellite position data to compute the station's latitude and longitude. However, because of size/space/cost constraints on the design of the mobile stations 13, the GPS receiver 59 in the mobile station 13 often will have only reception capability, not the full GPS processing capability to resolve position from signals received from the satellites 39. Hence, the receiver 59 supplies the GPS measurement and code data to the microprocessors 51, 52 which in turn formats the data and sends it to the PDE 37 using the wireless transceiver 47. Again, this information can be secured using the scrambling algorithm 14 prior to transmission the PDE 37. The PDE 37 performs the data processing necessary to determine the latitude and longitude of the station 13 and transmits that data where needed, which in some cases will be back to the mobile station 13 for further processing. The structure and operation of the mobile station 13, as outlined above, were described to by way of example, only.

Another example of securing communications among a single device involves a network connection card and a laptop. As mobile communications networks continue to provide enhanced data rates, consumers are staring to use mobile communications networks as Internet service provides. Although some laptops come equipped with built-in modems to access these mobile communications networks 10, a number of them to do not. Thus, carriers offer network cards to access their networks. These cards provide modem functionality and include their own processing devices. The network card communicates with the processor of the laptop thus it may be necessary secure communications between the network card and the processor of the laptop.

Figures 5, 6:
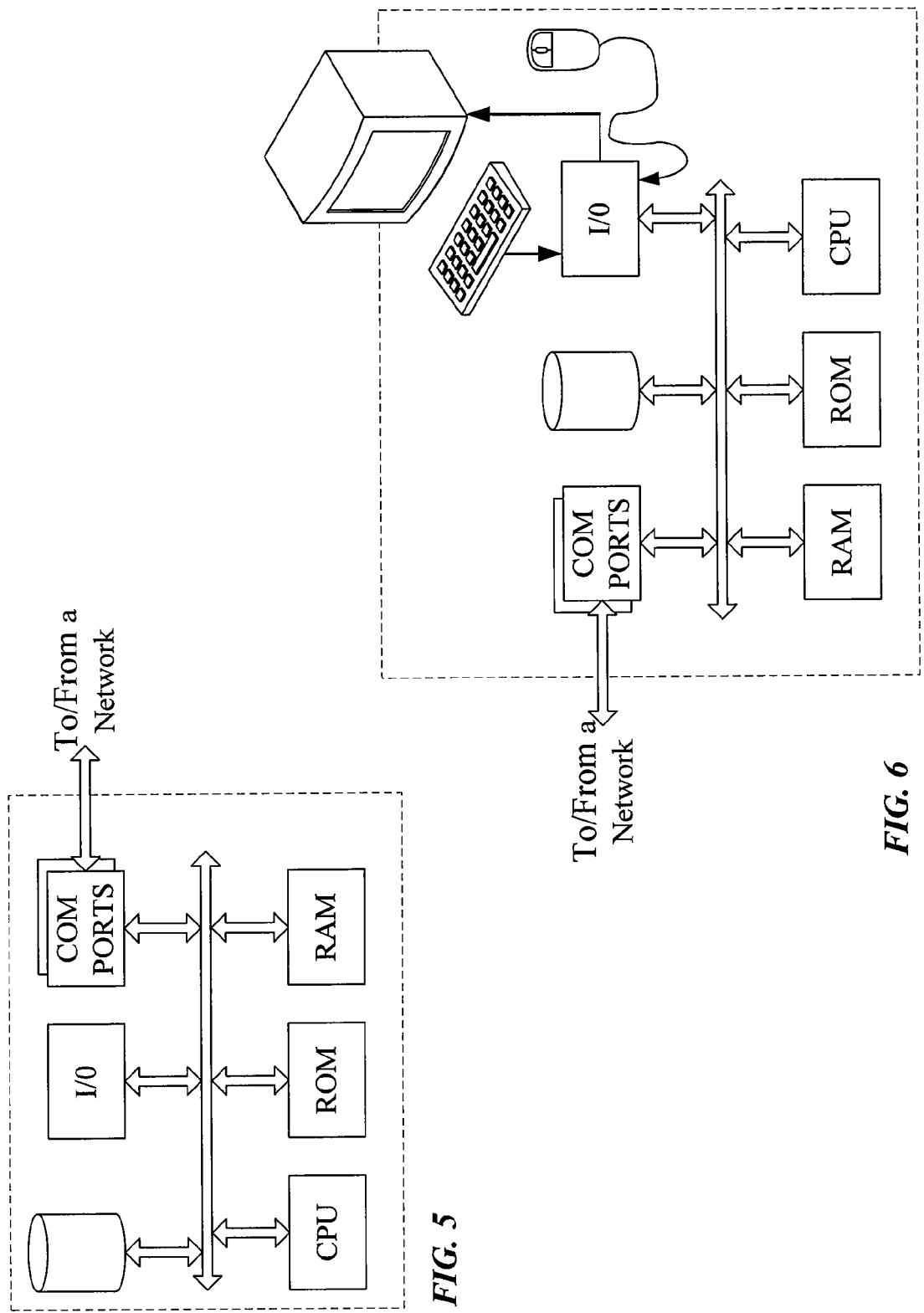
FIG. 5 is a simplified functional block diagram of a computer that may be configured as a host or server.
FIG. 6 is a simplified functional block diagram of a personal computer or other work station or terminal device.

FIGS. 5 and 6 provide functional block diagram illustrations of general purpose computer hardware platforms. FIG. 5 illustrates a network or host computer platform, as may typically be used to implement a server or come of the network elements (e.g., MSC 30, PDE 37, LPS 38, . . . ). FIG. 6 depicts a computer with user interface elements, as may be used to implement a personal computer (PC) or other type of work station or terminal device, although the computer of FIG. 6 may also act as a server if appropriately programmed. For example, such general purpose platforms may store the scrambling algorithm 14 and load the scrambling algorithm 14 into a mobile station 13, via a network communication if the platform is a server or via a local link if the platform is a PC. In addition, the processors of these devices can execute the scrambling algorithm 14, for example, if operating as the location proxy server (LPS) 38. Further, the memories of these devices can store the required mappings and secret parameters for use in the scrambling algorithm 14. It is believed that those skilled in the art are familiar with the structure, programming and general operation of such computer equipment and as a result the drawings should be self-explanatory.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load.

Hence, aspects of the methods of securing communications (e.g., location information) can be executed on servers, clients, mobile stations, network servers, and other computing platforms. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another computer or processor. For example, the software can be communicated to the mobile station 13. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the data aggregator, the customer communication system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution Those skilled in the art will recognize that the present teachings are amenable to a variety of modifications and/or enhancements. Although described in the context of a mobile communications network and mobile stations it should be understood that the teaching herein are equally applicable to other types of communications. For example, the techniques described herein can be used in a traditional client-server type relationship. The communications can occur of local area networks (LANS), wide array networks (WANs), and other types of networks as well.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

| | |
|---|---|
| 3GPP2: | 3rd generation partnership project 2 |
| BS: | base station |
| BTS: | base transceiver system |
| CCES: | customer care enterprise service |
| CDMA: | code division multiple access |
| CD-ROM: | compact disc read-only memory |
| DVD: | digital video disc |
| DVD-ROM: | digital versatile (video) disc read-only memory |
| EPROM: | erasable programmable read-only memory |
| ESN: | electronic serial number |
| EV-DO: | evolution-data optimized |
| GIS: | geographic information system |
| GPS: | global positioning system |
| GSM: | global system for mobile communications |
| HLR: | home location register |
| IP: | Internet protocol |
| IR: | infrared |
| LAN: | local area network |
| LBS: | location based services |
| LBSP: | location base services platform |
| LCD: | liquid crystal display |
| LPS: | location proxy server |
| LSB: | least significant bit |
| LTE: | long-term evolution |
| MC: | message center |
| MIM: | mobile instant messaging |
| MIN: | mobile identification number |
| MSB: | most significant bit |
| MOD: | music on demand |
| MPC: | mobile positioning center |
| MS: | mobile station |
| MSC: | mobile switching center |
| MS-MPC: | mobile station—mobile positioning center |
| ODS: | on-demand server |
| PC: | personal computer |
| PDA: | personal digital assistant |
| PDE: | position determining entity |
| PROM: | programmable read-only memory |
| RAM: | random access memory |
| RAN: | radio access network |
| RF: | radio frequency |
| ROM: | read-only memory |
| SSD: | shared secret data |
| TCP: | transmission control protocol |
| TDMA: | time-division multiple access |
| UMTS: | universal mobile telecommunications system |
| UPc: | user privacy component |
| VOD: | video on demand |
| WAN: | wide area network |
| XCVR: | transceiver |
| XML: | extensible mark-up language |
| XOR: | exclusive or |

What is claimed is:

1. A method of generating, by a mobile communication network device, a shared secret data having a length of M units, the method comprising the steps of:
performing, by the mobile communication network device, a first operation on groupings of one of N units of a randomly generated base shared secret data and one of a plurality of secret values thereby generating a plurality of first operation results, the randomly generated base shared secret data having a length of N units, where N is less than M;

mapping each of the N units of the base shared secret data and the plurality of secret values to corresponding secret integer values prior to performing the first operation;

performing, by the mobile communication network device, a second operation on a select plurality of the first operation results thereby generating a plurality of second operation results; and constructing, by the mobile communication network device, the shared secret data by combining in a specific order at least one of the first operation results and at least one of the plurality of second operation results.

2. The method of claim 1, wherein performing the first operation comprises performing modulo integer arithmetic on the groups of one of the N units of the base shared secret data and one of a plurality of secret values thereby generating a plurality of first operation results.

3. The method of claim 1, wherein performing the second operation comprises performing an exclusive OR (XOR) on the select plurality of the first operation results thereby generating the plurality of second operation results.

4. The method of claim 1, further comprising mapping a select plurality of the first operation results to corresponding secret values prior to performing the second operation.

5. The method of claim 1, further comprising generating the randomly generated base shared secret data prior to performing the first operation.

6. The method of claim 1, further comprising using the shared secret data during communications with another mobile communication network device.

7. The method of claim 6, wherein using the shared secret data comprises:
applying the shared secret data to other data to generate encrypted data; and
transmitting the encrypted data to the another mobile communication network device.

8. The method of claim 6, wherein using the shared secret data comprises decrypting received encrypted data using the shared secret data to generate unencrypted data at the mobile communication network device.

9. The method of claim 1, further comprising using the shared secret data during communication between a plurality of processors of a mobile communication network device.

10. A mobile communication network comprising:
a traffic network configured to support communications using a shared secret data; and
one or more mobile communication network devices in communication with the traffic network, the one or more mobile communication network devices configured to:
perform a first operation on groups of one of N units of a randomly generated base shared secret data and one of a plurality of secret values thereby generating a plurality of first operation results, the randomly generated base shared secret data having a length of N units, where N is less than M;
map each of the N units of the base shared secret data and the plurality of secret values to corresponding secret integer values prior to performing the first operation;
perform a second operation on a select plurality of the first operation results thereby generating a plurality of second operation results; and
construct the shared secret data by combining in a specific order at least one of the first operation results and at least one of the plurality of second operation results.

11. The mobile communication network of claim 10, wherein the one or more mobile communication network devices configured to perform the first operation comprises one or more mobile communication networks devices configured to perform modulo integer arithmetic on the groups of one of the N units of the base shared secret data and one of a plurality of secret values thereby generating a plurality of first operation results.

12. The mobile communication network of claim 10, wherein the one or more mobile communication network devices configured to perform the first operation comprises one or more mobile communication networks devices configured to perform an exclusive OR (XOR) on the select plurality of the first operation results thereby generating the plurality of second operation results.

13. The mobile communication network of claim 10, wherein the one or more mobile communication network devices are further configured to map a select plurality of the first operation results to corresponding secret values prior to performing the second operation.

14. The mobile communication network of claim 10, wherein the one or more mobile communication network devices is further configured to generate the randomly generated base shared secret data prior to performing the first operation.

15. The mobile communication network of claim 10, wherein the one or more mobile communication network devices is further configured to use the shared secret data during communications with another mobile communication network device.

16. The mobile communication network of claim 15, wherein the one or more mobile communication network devices configured to use the shared secret data is further configured to apply the shared secret data to other data to generate encrypted data and transmit the encrypted data to the another mobile communication network device.

17. The mobile communication network of claim 15, wherein the one or more mobile communication network devices configured to use the shared secret data is further configured to decrypt received encrypted data using the shared secret data to generate unencrypted data at the mobile communication network device.

18. The mobile communication network of claim 15, wherein the one or mobile communication network devices comprise mobile stations.

19. An article of manufacture comprising:
a non-transitory machine readable storage medium; and
executable program instructions embodied in the machine readable storage medium that when executed by a programmable mobile device in communication with a mobile communication network causes the mobile device to perform functions that generate a shared secret data having a length of M units, the functions comprising:
performing a first operation on groups of one of N units of a randomly generated base shared secret data and one of a plurality of secret values thereby generating a plurality of first operation results, the randomly generated base shared secret data having a length of N units, where N is less than M;
mapping each of the N units of the base shared secret data and the plurality of secret values to corresponding secret integer values prior to performing the first operation;
performing a second operation on a select plurality of the first operation results thereby generating a plurality of second operation results; and constructing the shared secret data by combining in a specific order at least one of the first operation results and at least one of the plurality of second operation results.

20. The article of manufacture of claim 19, wherein the function of performing the first operation comprises performing modulo integer arithmetic on the groups of one of the N units of the base shared secret data and one of a plurality of secret values thereby generating a plurality of first operation results.

21. The article of manufacture of claim 19, wherein the function of performing the second operation comprises performing an exclusive OR (XOR) on the select plurality of the first operation results thereby generating the plurality of second operation results.

22. The article of manufacture of claim 19, wherein the functions further comprise mapping a select plurality of the first operation results to corresponding secret values prior to performing the second operation.

23. The article of manufacture of claim 19, wherein the functions further comprise generating the randomly generated base shared secret data prior to performing the first operation.

24. The article of manufacture of claim 19, wherein the functions further comprise using the shared secret data during communications with another mobile communication network device.

25. The article of manufacture of claim 24, wherein the function of using the shared secret data comprises applying the shared secret data to other data to generate encrypted data and transmitting the encrypted data to the another mobile communication network device.

26. The article of manufacture of claim 24, wherein the function of using the shared secret data comprises decrypting received encrypted data using the shared secret data to generate unencrypted data at the mobile communication network device.

27. The article of manufacture of claim 19, wherein the functions further comprise using the shared secret data during communication between a plurality of processors of the mobile device.

28. A multi-mode mobile station configured to implement the steps of the method of claim 1 to generate a shared secret data having a length of M units.

29. An article of manufacture, comprising:
  instructions for causing a programmable multi-mode mobile station to implement the steps of the method of claim 1 to generate a shared secret data having a length of M units; and
  a non-transitory machine readable storage medium bearing the instructions.

* * * * *